(12) United States Patent
Sakaigaki et al.

(10) Patent No.: US 7,726,278 B2
(45) Date of Patent: Jun. 1, 2010

(54) INTERNAL COMBUSTION ENGINE CONTROL APPARATUS

(75) Inventors: Keiichiro Sakaigaki, Kobe (JP); Takao Ohno, Tokyo (JP); Akira Furuta, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 7 days.

(21) Appl. No.: 12/145,001

(22) Filed: Jun. 24, 2008

(65) Prior Publication Data

US 2009/0020100 A1 Jan. 22, 2009

(30) Foreign Application Priority Data

Jul. 18, 2007 (JP) .............................. 2007-186897

(51) Int. Cl.
*F02D 31/00* (2006.01)

(52) U.S. Cl. ...................................... 123/352; 123/350

(58) Field of Classification Search ................. 73/1.37, 73/17.3, 514.16, DIG. 3, 114.26; 123/179.3, 123/179.4, 198 D, 350, 406.11, 406.12, 406.13, 123/406.58, 630, 631, 352, 406.18, 603; 701/30, 35, 114
See application file for complete search history.

(56) References Cited

U.S. PATENT DOCUMENTS

| | | | | |
|---|---|---|---|---|
| 4,502,446 A | * | 3/1985 | Kanegae et al. .............. 123/479 |
| 4,522,168 A | * | 6/1985 | Ogawa et al. ............ 123/198 D |
| 4,785,771 A | * | 11/1988 | Ibuki et al. .............. 123/179.17 |
| 5,253,172 A | * | 10/1993 | Ito et al. ....................... 701/41 |
| 5,345,915 A | * | 9/1994 | Schmitz-Huebsch et al. ........................... 123/497 |
| 6,778,899 B2 | * | 8/2004 | Weimer et al. .............. 701/115 |
| 7,051,693 B2 | * | 5/2006 | Tetsuno et al. ........... 123/179.5 |
| 7,156,078 B1 | * | 1/2007 | Furuta ......................... 123/478 |
| 2002/0036475 A1 | * | 3/2002 | Okamoto ..................... 318/445 |
| 2004/0226530 A1 | * | 11/2004 | Kojima ..................... 123/179.3 |
| 2006/0042578 A1 | * | 3/2006 | Izumi et al. .............. 123/90.17 |
| 2006/0157023 A1 | * | 7/2006 | Matsuki et al. ......... 123/339.16 |
| 2006/0207310 A1 | * | 9/2006 | Kuwata et al. ................ 73/1.37 |

FOREIGN PATENT DOCUMENTS

| | | |
|---|---|---|
| JP | 60-132040 | 7/1985 |
| JP | 2000-205026 | 7/2000 |
| JP | 2001-304080 A | 10/2001 |
| JP | 2002-089133 | 3/2002 |
| JP | 2004-257249 | 9/2004 |
| JP | 2005-127169 | 5/2005 |
| JP | 2005-233622 A | 9/2005 |
| JP | 2005-351211 | 12/2005 |
| JP | 2006-194200 | 7/2006 |

OTHER PUBLICATIONS

Japanese Office Action dated Aug. 3, 2009.

* cited by examiner

*Primary Examiner*—Stephen K Cronin
*Assistant Examiner*—David Hamaoui
(74) *Attorney, Agent, or Firm*—Sughrue Mion, PLLC

(57) ABSTRACT

In order to accurately detect an abnormal state of a rotation direction detection unit for detecting a rotation direction of a crank shaft, provided is an internal combustion engine control apparatus including: a rotation detection unit including the rotation direction detection unit for detecting the rotation direction of the crank shaft of an engine to output a rotation direction signal, and a rotation speed detection unit for outputting a pulse signal according to a rotation speed of the crank shaft; a stop position calculation unit for calculating, based on an output from the rotation detection unit, a stop position of the crank shaft when the engine stops; and an abnormal state detection unit for detecting the abnormal state of the rotation direction detection unit when an actual rotation direction of the crank shaft differs from the rotation direction of the crank shaft based on the rotation direction signal.

7 Claims, 8 Drawing Sheets

INTERNAL COMBUSTION ENGINE CONTROL APPARATUS

BACKGROUND OF THE INVENTION

1. Field of the Invention

The present invention relates to an internal combustion engine control apparatus including a rotation direction detection unit for detecting a rotation direction of a crank shaft of an internal combustion engine.

2. Description of the Related Art

Recently, an idling stop apparatus for performing idling stop control has been proposed for fuel saving and the reduction of $CO_2$ emissions. The idling stop control automatically stops an internal combustion engine (hereinafter, referred to simply as an engine) when a stop condition is satisfied as in the case where the engine is idled and then automatically restarts the engine when a restart condition is satisfied as in the case where a starting operation is performed. Such an idling stop apparatus is required to immediately restart the engine in response to the starting operation or the like.

In view of such a requirement, the following engine starting technique has been proposed. According to the technique, an absolute crank angle of a crank shaft when the engine is stopped is detected to inject a fuel into a specific cylinder (for example, a cylinder on an expansion stroke) in a stop state and to then ignite the fuel. As a result, the energy on combustion immediately starts the engine.

However, when the crank shaft is not in a proper position in the engine stop state, the amount of air in the cylinders is remarkably reduced to prevent sufficient energy on combustion from being obtained or the stroke in which the energy on combustion works on a piston is too short. As a result, there is a possibility that the engine cannot start normally.

In order to solve the above-mentioned problem, a conventional control apparatus for a power train uses a motor generator to rotate a crank shaft to a predetermined position when the crank shaft is not in a proper position in the engine stop state (for example, see Japanese Patent Application Laid-open No. 2001-304080; hereinafter, referred to as Patent Document 1).

It should be noted that if a rotary torque is smaller than a compression force in the vicinity of a compression top dead center when the engine is stopped, a piston sometimes cannot pass the compression top dead center to cause the crank shaft to rotate in the reverse direction. Therefore, in order to accurately detect the stop position of the crank shaft when the engine is stopped, it is necessary to detect the rotation direction of the crank shaft.

However, the conventional apparatus described in Patent Document 1 cited above has a problem in that the stop position of the crank shaft cannot be accurately detected because the rotation direction of the crank shaft is not detected.

Therefore, in order to solve the above-mentioned problem of the conventional apparatus, a conventional rotation detection apparatus includes a rotation direction detection unit having a rotation sensor for detecting a projection provided on a rotary member (crank shaft), an auxiliary sensor for detecting the projection of the rotary member, which is provided at the position offset from the position of the rotation sensor in a circumferential direction, and a processing circuit for determining a forward rotation state or a reverse rotation state of the crank shaft based on outputs from the rotation sensor and the auxiliary sensor to output a rotation direction at a time width of a pulse signal (for example, see Japanese Patent Application Laid-open No. 2005-233622; hereinafter, referred to as Patent Document 2).

In the conventional apparatus described in Patent Document 2 cited above, the rotation direction detection unit detects the rotation direction of the crank shaft based on the outputs from the rotation sensor and the auxiliary sensor.

In the event of a failure in the rotation direction detection unit, it is difficult to accurately detect the stop position of the crank shaft. As a result, there is a possibility that the engine cannot restart. In the event of the wrong recognition of the stop position of the crank shaft, a fuel is injected into a wrong cylinder to be ignited. As a result, there is a possibility that the engine or a suction/exhaust system is damaged by backfire or the like. In order to prevent the above-mentioned problems from occurring, it is necessary to detect an abnormal state of the rotation direction detection unit.

However, since the conventional apparatus described in Patent Document 2 cited above does not detect the abnormal state of the rotation direction detection unit, there is a problem in that engine restart fails or the engine or the suction/exhaustion system is damaged.

SUMMARY OF THE INVENTION

The present invention is devised to solve the problems as described above and has an object of providing an internal combustion engine control apparatus which can ensure the detection of an abnormal state of a rotation direction detection unit for detecting a rotation direction of a crank shaft.

The present invention provides an internal combustion engine control apparatus including: rotation detection means including a rotation direction detection unit for detecting a rotation direction of a crank shaft of an internal combustion engine to output one of a forward rotation signal and a reverse rotation signal as a rotation direction signal, and a rotation speed detection unit for outputting a pulse signal according to a rotation speed of the crank shaft; stop position calculation means for calculating, based on an output from the rotation detection means, a stop position of the crank shaft when the internal combustion engine stops; and abnormal state detection means for detecting an abnormal state of the rotation direction detection means. In the internal combustion engine control apparatus, the abnormal state detection means detects the abnormal state of the rotation direction detection unit when an actual rotation direction of the crank shaft differs from the rotation direction of the crank shaft based on the rotation direction signal.

According to the internal combustion engine control apparatus of the present invention, the abnormal state detection means detects the abnormal state of the rotation direction detection unit when an actual rotation direction of the crank shaft differs from the rotation direction of the crank shaft based on the rotation direction signal.

Thus, the detection of the abnormal state of the rotation direction detection unit for detecting the rotation direction of the crank shaft can be ensured.

DETAILED DESCRIPTION OF PREFFERED EMBODIMENTS

Hereinafter, each embodiment of the present invention will be described based on the accompanying drawings. The same or equivalent members and parts are denoted by the same reference numerals in each of the drawings.

In the following embodiments, the case where an internal combustion engine control apparatus is mounted in a vehicle is described.

First Embodiment

Figure 1:
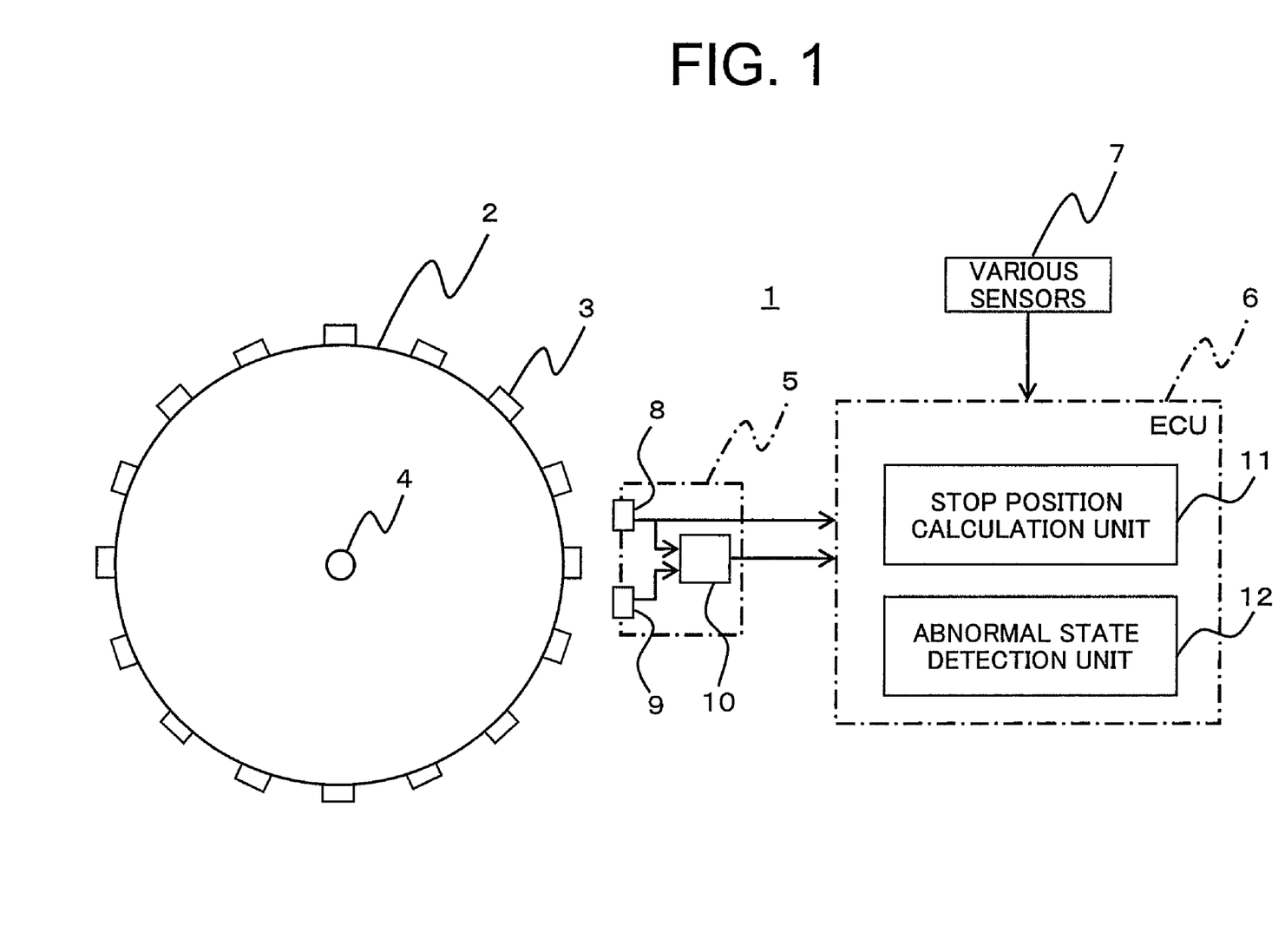
FIG. 1 is a block configuration diagram illustrating an internal combustion engine control apparatus according to a first embodiment of the present invention together with a signal rotor.

FIG. 1 is a block configuration diagram illustrating an internal combustion engine control apparatus 1 according to a first embodiment of the present invention together with a signal rotor 2.

In FIG. 1, the signal rotor 2 is a disc-like shaped member. On an outer circumference of the signal rotor 2, multiple projections 3 are provided at predetermined angles (intervals) to be separated from each other. A center of the signal rotor 2 is secured to a crank shaft 4 of an internal combustion engine (hereinafter, referred to simply as an engine; not shown). The signal rotor 2 rotates in synchronization with the rotation of the crank shaft 4.

In FIG. 1, a clockwise direction is a forward rotation direction, whereas a counter clockwise direction is a reverse rotation direction.

The international combustion engine control apparatus 1 includes a rotation detection device 5 (rotation detection means) and an electronic control unit 6 (hereinafter, referred to as an "ECU 6"), and various sensors 7.

The rotation detection device 5 is provided in the vicinity of the signal rotor 2, and is electrically connected to the ECU 6. The rotation detection device 5 includes two crank angle sensors (a rotation sensor 8 and an auxiliary sensor 9), and a logic circuit 10.

The two crank angle sensors (the rotation sensor 8 and the auxiliary sensor 9) are provided to be separated from each other in a rotation direction of the signal rotor 2. Of the two sensors, the sensor which is provided on the retard side is the rotation sensor 8 for mainly detecting the projections 3 of the signal rotor 2. The sensor which is provided on the advance side is the auxiliary sensor 9 for detecting a forward rotation state or a reverse rotation state of the crank shaft 4.

The rotation sensor 8 detects the projections 3 of the signal rotor 2 to output a pulse signal according to a rotation speed of the crank shaft 4 to the ECU 6 and the logic circuit 10. The auxiliary sensor 9 similarly detects the projections 3 to output a pulse signal according to the rotation speed of the crank shaft 4 to the logic circuit 10.

Each of the pulse signals is at "H" level when the projection 3 passes through the positions opposed to the rotation sensor 8 and the auxiliary sensor 9, whereas each of the pulse signals is at "L" level when a valley (surface) between the projections 3 passes through the positions opposed to the rotation sensor 8 and the auxiliary sensor 9.

The logic circuit 10 detects the rotation direction of the crank shaft 4 based on the combination of the pulse signals respectively output from the rotation sensor 8 and the auxiliary sensor 9 to output a forward rotation signal "H" or a reverse rotation signal "L" as a rotation direction signal.

In the rotation detection device 5, the rotation sensor 8, the auxiliary sensor 9, and the logic circuit 10 constitute a rotation direction detection unit. The rotation sensor 8 constitutes a rotation speed detection unit.

Figure 2:
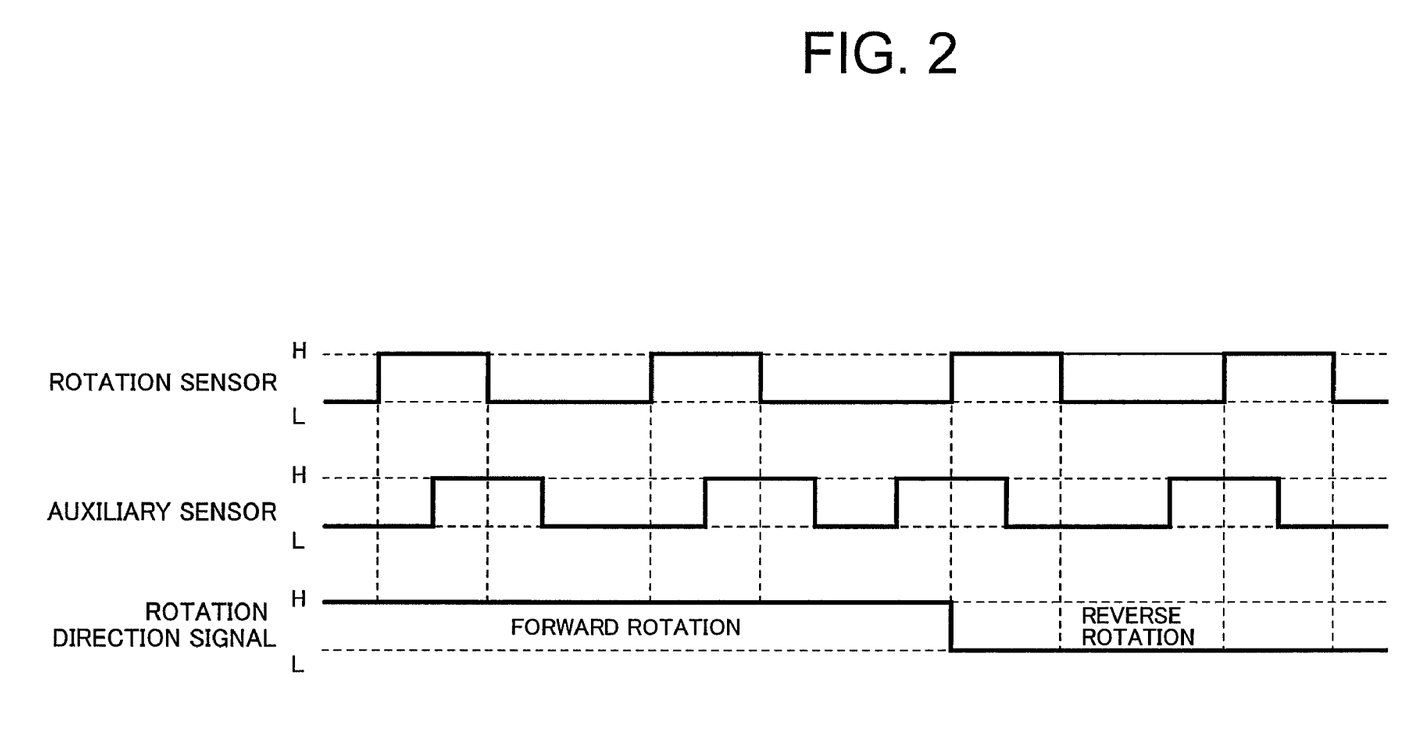
FIG. 2 is an explanatory view illustrating processing of detecting a rotation direction by a rotation direction detection unit according to the first embodiment of the present invention.

Referring to FIG. 2, processing of detecting the rotation direction by the rotation direction detection unit will now be described.

FIG. 2 is an explanatory view illustrating the processing of detecting the rotation direction by the rotation direction detection unit according to the first embodiment of the present invention.

In FIG. 2, in the case where the pulse signal output from the rotation sensor 8 changes from "L" to "H", the rotation direction detection unit detects the forward rotation state of the crank shaft 4 to output the forward rotation signal "H" as the rotation direction signal when the pulse signal from the auxiliary sensor 9 is at the "L" level. In the case where the pulse signal output from the rotation sensor 8 changes from "H" to "L", the rotation direction detection unit detects the forward rotation state of the crank shaft 4 to output the forward rotation signal "H" as the rotation direction signal when the pulse signal from the auxiliary sensor 9 is at the "H" level.

In the case where the pulse signal output from the rotation sensor 8 changes from "L" to "H", the rotation direction detection unit detects the reverse rotation state of the crank shaft 4 to output the reverse rotation signal "L" as the rotation direction signal when the pulse signal from the auxiliary sensor 9 is at the "H" level. In the case where the pulse signal output from the rotation sensor 8 changes from "H" to "L", the rotation direction detection unit detects the reverse rotation state of the crank shaft 4 to output the reverse rotation signal "L" as the rotation direction signal when the pulse signal from the auxiliary sensor 9 is at the "L" level.

Returning to FIG. 1, the ECU 6 performs injection control for fuel injection into a cylinder or ignition control for fuel ignition based on each of operating states (for example, an intake airflow, a throttle opening, and the like) input from the various sensors 7. In order to perform the above-mentioned controls in a preferred manner, the ECU 6 loads the rotation direction signal from the rotation direction detection unit to detect the position of the crank shaft 4.

In order to quickly determine the cylinder to which the fuel is to be injected and ignited at the engine start, the ECU 6 includes a stop position calculation unit 11 (stop position calculation means) for calculating a stop position of the crank shaft 4 when the engine is stopped, and an abnormal state detection unit 12 (abnormal state detection means) for detecting an abnormal state of the rotation direction detection unit of the rotation detection device 5.

The ECU 6 is constituted by a microprocessor (not shown) including a CPU and a memory which stores a program. Each of the blocks constituting the ECU 6 is stored as software in the memory.

The stop position calculation unit 11 uses a counter (not shown) to count the pulse signals from the rotation sensor 8 to calculate a crank angle, thereby calculating the stop position of the crank shaft 4. The stop position calculation unit 11 increments a value of the counter in response to the pulse signal from the rotation sensor 8 when the rotation direction signal from the rotation direction detection unit is the forward rotation signal. On the other hand, the stop position calculation unit 11 decrements the value of the counter in response to the pulse signal from the rotation sensor 8 when the rotation direction signal from the rotation direction detection unit is the reverse rotation signal.

Specifically, even if the piston cannot pass the compression top dead center to cause the reverse rotation of the crank shaft 4 when the engine is stopped, the pulse signals from the rotation sensor 8 are counted up or down according to the rotation direction of the crank shaft 4. As a result, the stop position calculation unit 11 can accurately calculate the stop position of the crank shaft 4.

The abnormal state detection unit 12 detects the abnormal state of the rotation direction detection unit when the actual rotation direction of the crank shaft 4, which is determined based on the operating condition of the engine, differs from the rotation direction of the crank shaft 4 based on the rotation direction signals from the rotation direction detection unit.

More specifically, in the case where the crank shaft 4 rotates in the forward direction at a speed equal to or higher than a predetermined rotation speed, the rotation direction detection unit outputs the reverse rotation signal. When this state successively occurs for a predetermined times, the abnormal state detection unit 12 detects the abnormal state of the rotation direction detection unit.

Hereinafter, referring to a flowchart of FIG. 3 together with FIGS. 1 and 2, an operation of the abnormal state detection unit 12 according to the first embodiment of the present invention will be described.

The operation illustrated in the flowchart is repeatedly executed for each predetermined crank angle of the crank shaft 4 (for example, for each BTDC (before top dead center) 80 degree CA (crank angle) after vehicle startup.

In this case, a failure (abnormal state) of the rotation sensor 8 for detecting the rotation speed of the crank shaft 4 is not taken into consideration, or the rotation sensor 8 has a duplex system. Therefore, it is assumed that the rotation speed of the crank shaft 4 is an accurate value.

An abnormal state detection counter and an abnormal state detection flag described below are reset to "0" by an initialization routine executed upon activation of the ECU 6.

First, the abnormal state detection unit 12 determines whether or not the rotation speed of the crank shaft 4 is a predetermined rotation speed or higher (Step S21).

When it is determined that the rotation speed of the crank shaft 4 is the predetermined rotation speed or higher (in other words, determined as "Yes") in Step S21, the abnormal state detection unit 12 loads the rotation direction signal from the rotation direction detection unit (Step S22).

Subsequently, the abnormal state detection unit 12 determines whether or not the rotation direction signal is the reverse rotation signal "L" (Step S23).

When it is determined in Step S23 that the rotation direction signal is the reverse rotation signal "L" (in other words, determined as "Yes"), the abnormal state detection unit 12 determines there is a possibility that some abnormality occurs in the rotation direction detection unit to increment the abnormal state detection counter (Step S24).

Next, the abnormal state detection unit 12 determines whether or not a value of the abnormal state detection counter is a predetermined value or larger (Step S25).

When it is determined in Step S25 that the value of the abnormal state detection counter is the predetermined value or larger (in other words, determined as "Yes"), the abnormal state detection unit 12 detects the abnormal state of the rotation direction detection unit to set the abnormal state detection flag (Step S26). Then, the processing of FIG. 3 is terminated.

Figure 3:
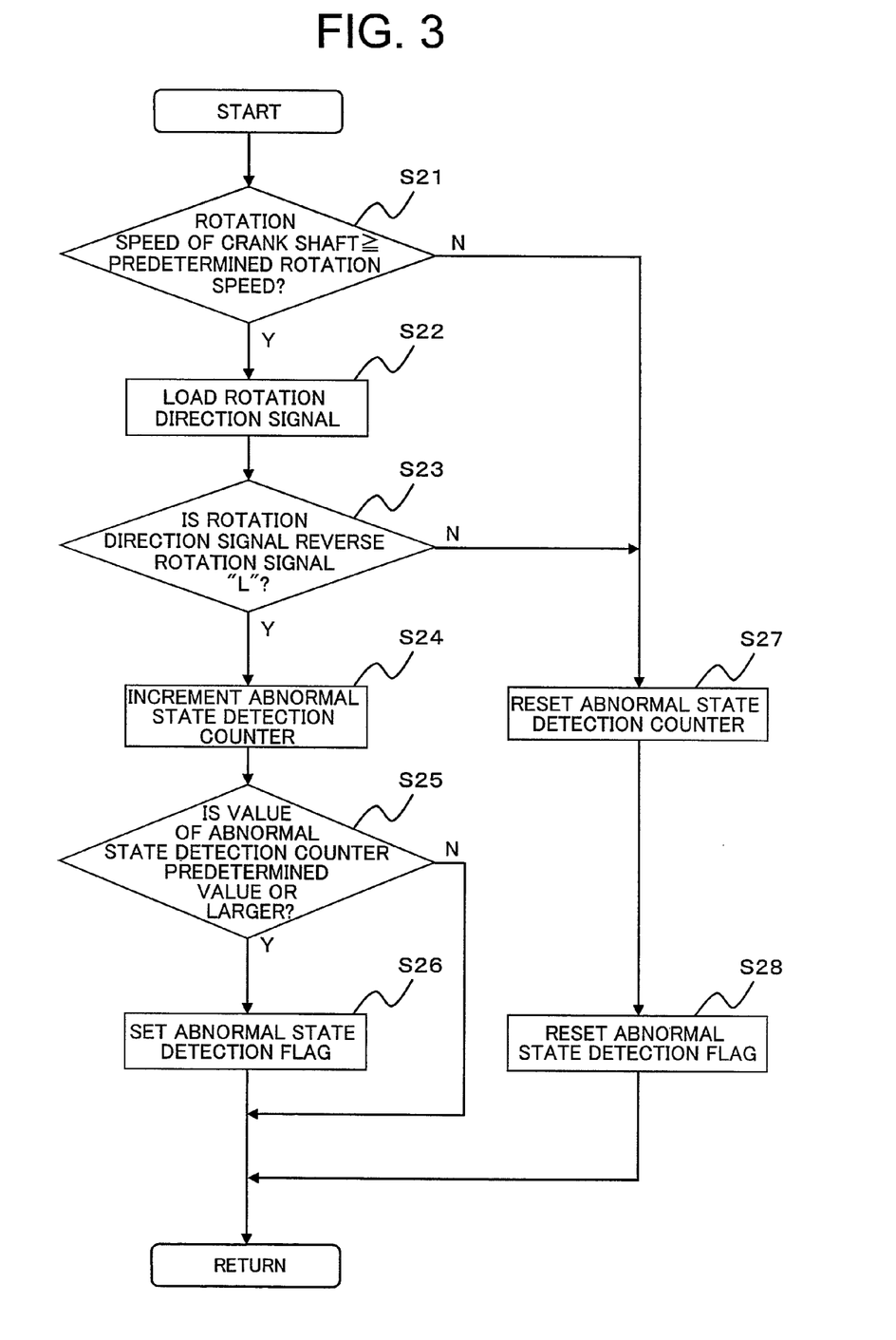
FIG. 3 is a flowchart illustrating an operation of an abnormal state detection unit according to the first embodiment of the present invention.

On the other hand, when it is determined in Step S25 that the value of the abnormal state detection counter is smaller than the predetermined value (in other words, determined as "No"), the abnormal state detection unit 12 immediately terminates the processing of FIG. 3.

Further, when it is determined in Step S21 that the rotation speed of the crank shaft 4 is smaller than the predetermined rotation speed (in other words, determined as "No") and it is determined in Step S23 that the rotation direction signal is the forward rotation signal "H" (in other words, determined as "No"), the abnormal state detection unit 12 determines that the rotation direction detection unit is normal to reset the abnormal state detection counter (Step S27).

Subsequently, the abnormal state detection unit 12 resets the abnormal state detection flag (Step S28) to terminate the processing of FIG. 3.

According to the internal combustion engine control apparatus 1 of the first embodiment of the present invention, the abnormal state detection unit 12 detects the abnormal state of the rotation direction detection unit based on the rotation speed of the crank shaft 4 and the rotation direction signal from the rotation direction detection unit.

Specifically, when the rotation speed of the crank shaft 4 is the predetermined rotation speed or higher, the crank shaft 4 always rotates in a forward direction. Therefore, when the reverse rotation signal is output from the rotation direction detection unit in this case, it is ensured that the abnormal state detection unit 12 detects the abnormal state of the rotation direction detection unit.

When the abnormal state of the rotation direction detection unit is detected, a driver is notified of the abnormal state to be invited to repair the vehicle by a method of lighting an indicator lamp on a meter panel or the like. As a result, the engine restart failure or the damage to the engine or the suction/exhaust system caused by the backfire or the like can be prevented.

Second Embodiment

In the first embodiment described above, the abnormal state of the rotation direction detection unit is detected in the case where the crank shaft 4 rotates in the forward direction at a speed equal to or higher than the predetermined rotation speed. However, the detection of the abnormal state of the rotation direction detection unit is not limited to the above-mentioned case. Even when the crank shaft 4 is rotated in the forward direction by a starter motor for starting the engine, the abnormal state of the rotation direction detection unit may be detected.

Hereinafter, processing of detecting the abnormal state of the rotation direction detection unit when the driver operates the starter motor to rotate the crank shaft 4 in the forward direction, for example, at the engine startup, will be described.

Since the configuration of the internal combustion engine control apparatus 1 according to a second embodiment of the present invention is the same as the configuration described in the first embodiment above, the detailed description thereof is herein omitted.

In this case, when the crank shaft 4 is rotated in the forward direction by the starter motor (not shown) for starting the engine, the reverse rotation signal is output from the rotation direction detection unit. When this state successively occurs for a predetermined times, the abnormal state detection unit 12 detects the abnormal state of the rotation direction detection unit.

Subsequently, referring to a flowchart of FIG. 4 together with FIGS. 1 to 3, an operation of the abnormal state detection unit 12 according to the second embodiment of the present invention is described.

Figure 4:
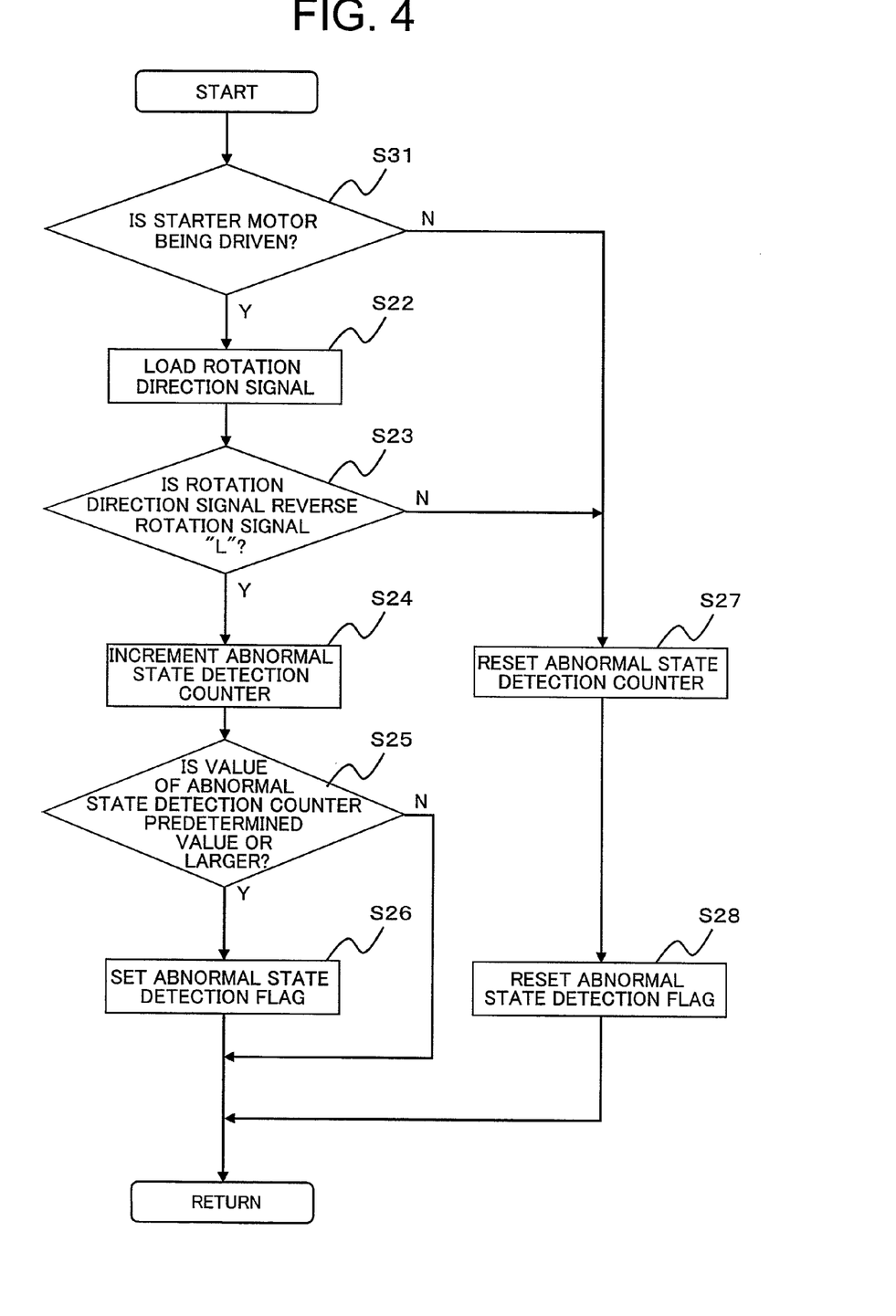
FIG. 4 is a flowchart illustrating an operation of the abnormal state detection unit according to a second embodiment of the present invention.

As in the first embodiment described above, the operation illustrated in the flowchart of FIG. 4 is repeatedly executed for each predetermined crank angle of the crank shaft 4 (for example, for each before top dead center (BTDC) 80 degree CA (crank angle)) after the vehicle startup.

First, the abnormal state detection unit 12 determines whether or not the starter motor is being driven (Step S31).

When it is determined in Step S31 that the starter motor is being driven (in other words, determined as "Yes"), the abnormal state detection unit 12 loads the rotation direction signal from the rotation direction detection unit (Step S22).

On the other hand, when it is determined in Step S31 that the starter motor is not being driven (in other words, determined as "No"), the abnormal state detection unit 12 determines that the rotation direction detection unit is normal to reset the abnormal state detection counter (Step S27).

Since the subsequent operation is the same as the operation in the first embodiment described above, the description thereof is herein omitted.

According to the internal combustion engine control apparatus 1 in the second embodiment of the present invention, the abnormal state detection unit 12 detects the abnormal state of the rotation direction detection unit based on the driving state of the starter motor and the rotation direction signal from the rotation direction detection unit.

Specifically, the crank shaft 4 always rotates in the forward direction while the starter motor is being driven. Therefore, when the reverse rotation signal is output from the rotation direction detection unit in this case, the abnormal state detection unit 12 detects the abnormal state of the rotation direction detection unit without fail.

Third Embodiment

In the first and second embodiments described above, the abnormal state of the rotation direction detection unit is detected when the crank shaft 4 rotates in the forward direction. However, the detection of the abnormal state of the rotation direction detection unit is not limited to the above-mentioned cases. The abnormal state of the rotation direction detection unit may be detected even when the crank shaft 4 is rotated in the reverse direction by a motor generator for rotating the crank shaft 4 in an arbitrary direction.

Hereinafter, processing of detecting the abnormal state of the rotation direction detection unit, when the crank shaft 4 is rotated in the reverse direction by the motor generator, is described.

Since the configuration of the internal combustion engine control apparatus 1 according to the third embodiment of the present invention is the same as the configuration described in the first embodiment above, the detailed description thereof is herein omitted.

In this case, when the crank shaft 4 is rotated in the reverse direction by the motor generator (not shown) attached to the crank shaft 4, the forward rotation signal is output from the rotation direction detection unit. When this state successively occurs a predetermined times, the abnormal state detection unit 12 detects the abnormal state of the rotation direction detection unit.

Subsequently, referring to a flowchart of FIG. 5 together with FIGS. 1 to 4, the operation of the abnormal state detection unit 12 according to the third embodiment of the present invention is described.

Figure 5:
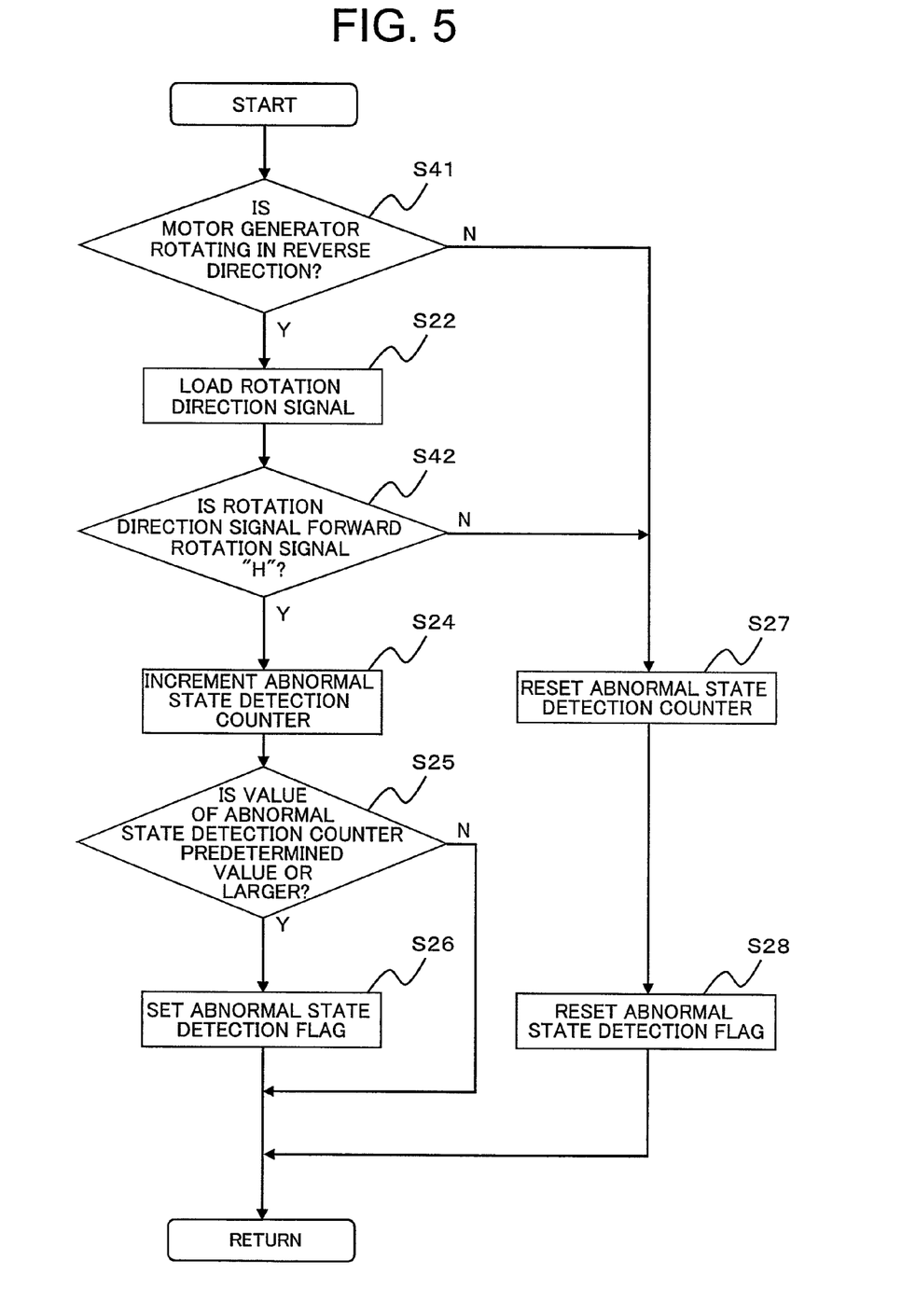
FIG. 5 is a flowchart illustrating an operation of the abnormal state detection unit according to a third embodiment of the present invention.

As in the first embodiment described above, the operation illustrated in the flowchart of FIG. 5 is repeatedly executed for each predetermined crank angle of the crank shaft 4 (for example, for each before top dead center (BTDC) 80 degree CA (crank angle)) after the vehicle startup.

First, the abnormal state detection unit 12 determines whether or not the motor generator is rotating in the reverse direction (Step S41).

When it is determined in Step S41 that the motor generator is rotating in the reverse direction (in other words, determined as "Yes"), the abnormal state detection unit 12 loads the rotation direction signal from the rotation direction detection unit (Step S22).

Subsequently, the abnormal state detection unit 12 determines whether or not the rotation direction signal is the forward rotation signal "H" (Step S42).

When it is determined in Step S42 that the rotation direction signal is the forward rotation signal "H" (in other words, determined as "Yes"), the abnormal state detection unit 12 determines that there is a possibility that some abnormality occurs in the rotation direction detection unit to increment the abnormal state detection counter (Step S24).

On the other hand, when it is determined in Step S41 that the motor generator is not rotating in the reverse direction (in other words, determined as "No") and it is determined in Step S42 that the rotation direction signal is the reverse rotation signal "L" (in other words, determined as "No"), the abnormal state detection unit 12 determines that the rotation direction detection unit is normal to reset the abnormal state detection counter (Step S27).

Since the subsequent operation is the same as the operation described in the first embodiment above, the description thereof is herein omitted.

According to the internal combustion engine control apparatus 1 in the third embodiment of the present invention, the abnormal state detection unit 12 detects the abnormal state of the rotation direction detection unit based on the driving state (rotation direction) of the motor generator and the rotation direction signal from the rotation direction detection unit.

Specifically, the crank shaft 4 always rotates in the reverse direction while the motor generator is rotating in the reverse direction. Therefore, when the forward rotation signal is output from the rotation direction detection unit in this case, the abnormal state detection unit 12 detects the abnormal state of the rotation direction detection unit without fail.

Fourth Embodiment

During the execution of the idling stop control, the stop position of the crank shaft 4 at the engine stop is stored based on the pulse signal from the rotation detection device 5. In this manner, the cylinder into which the fuel is to be injected and ignited for the engine restart is immediately determined.

When some abnormality occurs in the rotation direction detection unit, however, the engine restart failure or the damage to the engine or the suction/exhaust system adversely occurs as described above.

In view of such a problem, the idling stop control in the case where some abnormality occurs in the rotation direction detection unit is described below.

Figure 6:
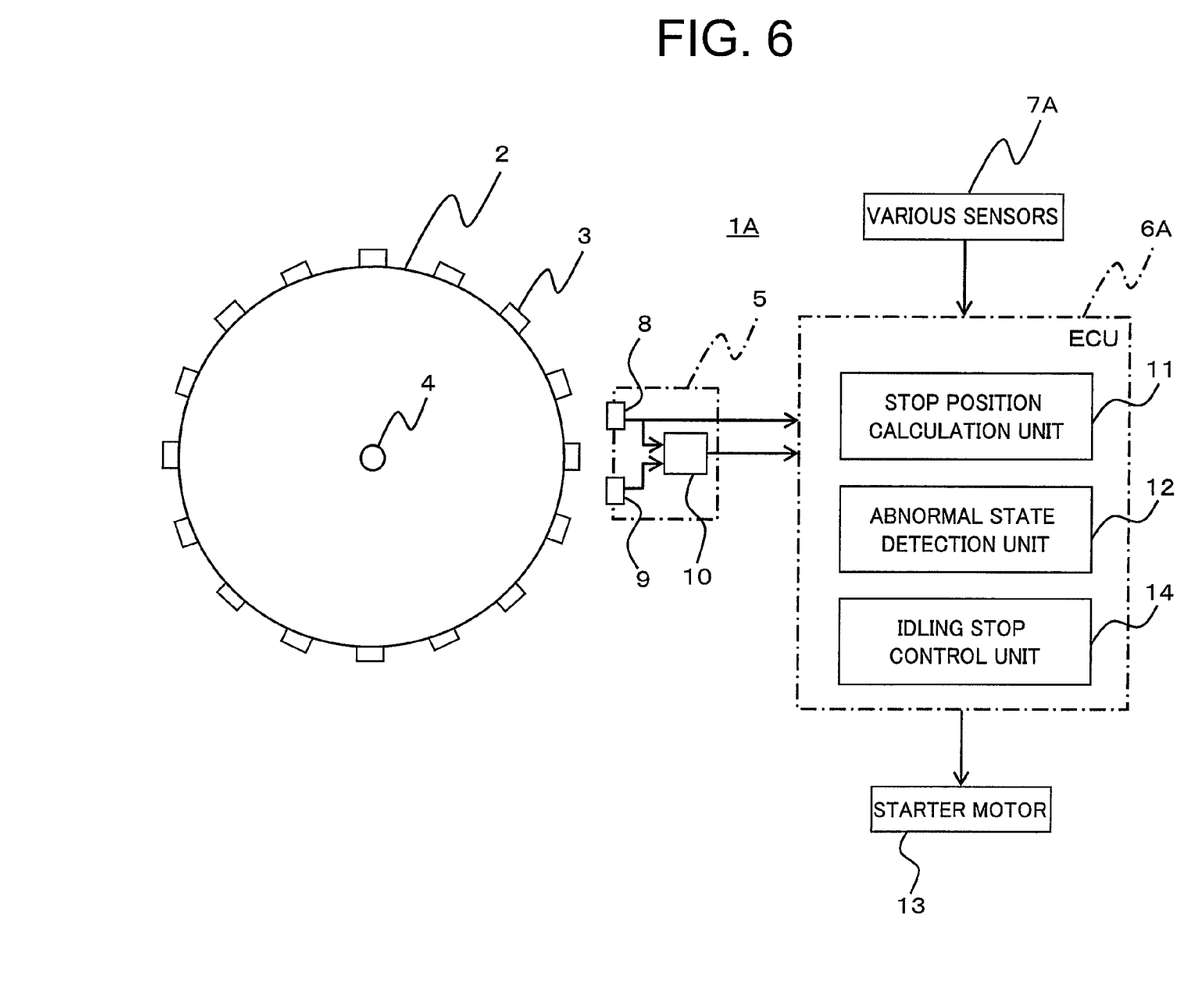
FIG. 6 is a block configuration diagram illustrating an internal combustion engine control apparatus according to a fourth embodiment of the present invention together with a signal rotor.

FIG. 6 is a block configuration diagram illustrating an internal combustion engine control apparatus 1A according to the fourth embodiment of the present invention together with the signal rotor 2.

In FIG. 6, the internal combustion engine control apparatus 1A includes a starter motor 13 for starting the engine. The internal combustion engine control apparatus 1A also includes an ECU 6A and various sensors 7A (operating state detection means) in place of the ECU 6 and various sensors 7 illustrated in FIG. 1.

The various sensors 7A include a vehicle speed sensor for detecting a speed (operating state) of the vehicle and a brake operation sensor for detecting an operating state of a brake provided for the vehicle.

The ECU 6A includes an idling stop control unit 14 (idling stop control means) for performing the idling stop control in response to outputs from the various sensors 7A.

Specifically, the idling stop control unit 14 first determines, based on the outputs from various sensors 7A, whether or not idling stop conditions for performing the idling stop control have been established. Subsequently, the idling stop control unit 14 determines whether or not the abnormal state detection unit 12 has detected the abnormal state of the rotation direction detection unit. When the abnormal state is detected, the idling stop control unit 14 stops the idling stop control.

The idling stop control performed by the idling stop control unit 14 is now described.

For restarting the engine after idling stop, the idling stop control unit 14 injects a fuel into a specific cylinder (for example, cylinder on an expansion stroke) of the engine and ignites the fuel. By using the energy on combustion, the idling stop control unit 14 immediately restarts the engine. Moreover, when the engine restart by the above-mentioned method (method of injecting the fuel into the specific cylinder of the engine and igniting the injected fuel) fails, the idling stop control unit 14 drives the starter motor 13 to restart the engine.

Since the remaining configuration is the same as the configuration of the first embodiment described above, the description thereof is herein omitted.

Hereinafter, referring to a flowchart of FIG. 7 together with FIG. 6, an operation of the idling stop control unit 14 according to the fourth embodiment of the present invention is described.

The operation illustrated in the flowchart is repeatedly executed for each predetermined time period (for example, every 5 msec) after the vehicle startup.

First, the idling stop control unit 14 determines, based on the outputs from the various sensors 7A, whether or not the idling stop conditions have been established (Step S51).

In this case, it is assumed that the idling stop conditions are the vehicle speed of 0 km/h and the brake operating state.

When it is determined in Step S51 that the idling stop conditions have been established (in other words, determined as "Yes"), the idling stop control unit 14 determines whether or not the rotation direction detection unit is normal (Step S52).

The normality/abnormality of the rotation direction detection unit is determined based on the result of detection of the abnormal state by the abnormal state detection unit 12 in the first embodiment described above.

Figure 7:
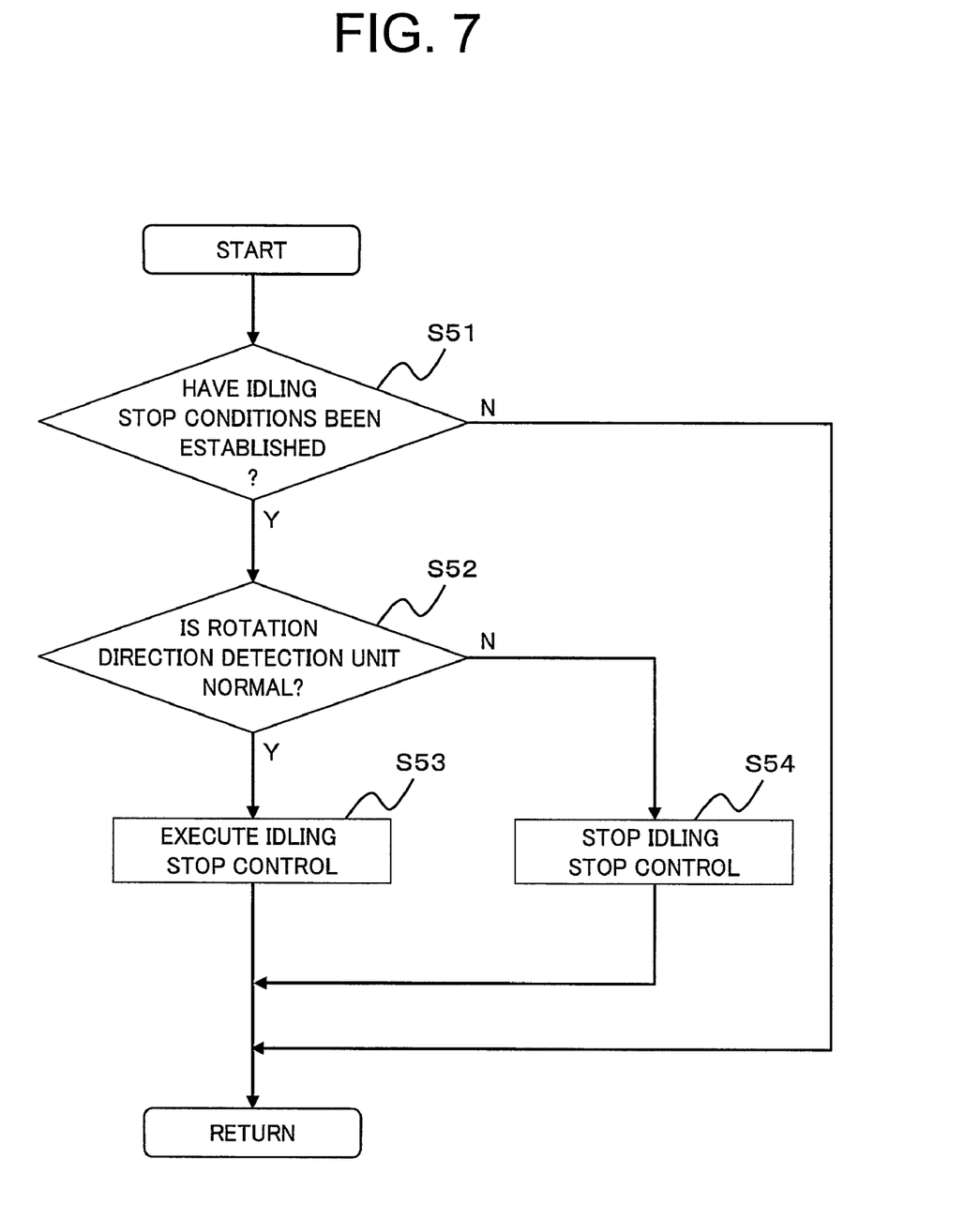
FIG. 7 is a flowchart illustrating an operation of an idling stop control unit according to the fourth embodiment of the present invention.

When it is determined in Step S52 that the rotation direction detection unit is normal (in other words, determined as "Yes"), the idling step control unit 14 executes the idling stop control (Step S53) to terminate the processing of FIG. 7.

On the other hand, when it is determined in Step S52 that some abnormality occurs in the rotation direction detection unit (in other words, determined as "No"), the idling stop control unit 14 stops the idling stop control (Step S54) to terminate the processing of FIG. 7.

On the other hand, when it is determined in Step S51 that the idling stop conditions have not been established (in other words, determined as "No"), the idling stop control unit 14 immediately terminates the processing of FIG. 7.

According to the internal combustion engine control apparatus 1A in the fourth embodiment of the present invention, the idling stop control unit 14 stops the idling stop control when the abnormal state of the rotation direction detection unit is detected even if the idling stop conditions have been established.

Therefore, a situation where the engine restart becomes difficult can be avoided in advance. In addition, the fuel is prevented from being injected into a wrong cylinder to be ignited. As a result, the engine or the suction/exhaust system can be prevented from being damaged.

Fifth Embodiment

In the fourth embodiment described above, the idling stop control unit 14 stops the idling stop control when the abnormal state of the rotation direction detection unit is detected. However, the operation of the idling stop control unit 14 is not limited to the above-mentioned case. When the abnormal state of the rotation direction detection unit is detected, the idling stop control unit 14 may use the starter motor 13 to restart the engine.

Hereinafter, processing in which the idling stop control unit 14 uses the starter motor 13 to restart the engine when some abnormality occurs in the rotation direction detection unit is described.

Since the configuration of the internal combustion engine control apparatus 1A according to the fifth embodiment of the present invention is the same as the configuration described in the fourth embodiment above, the detailed description thereof is herein omitted.

In this case, the idling stop control unit 14 first determines based on outputs from the various sensors 7A whether or not the idling stop conditions for executing the idling stop control have been established. Subsequently, the idling stop control unit 14 determines whether or not the abnormal state detection unit 12 has detected the abnormal state of the rotation direction detection unit. When the abnormal state is detected, the idling stop control unit 14 uses the starter motor 13 to restart the engine.

Figure 8:
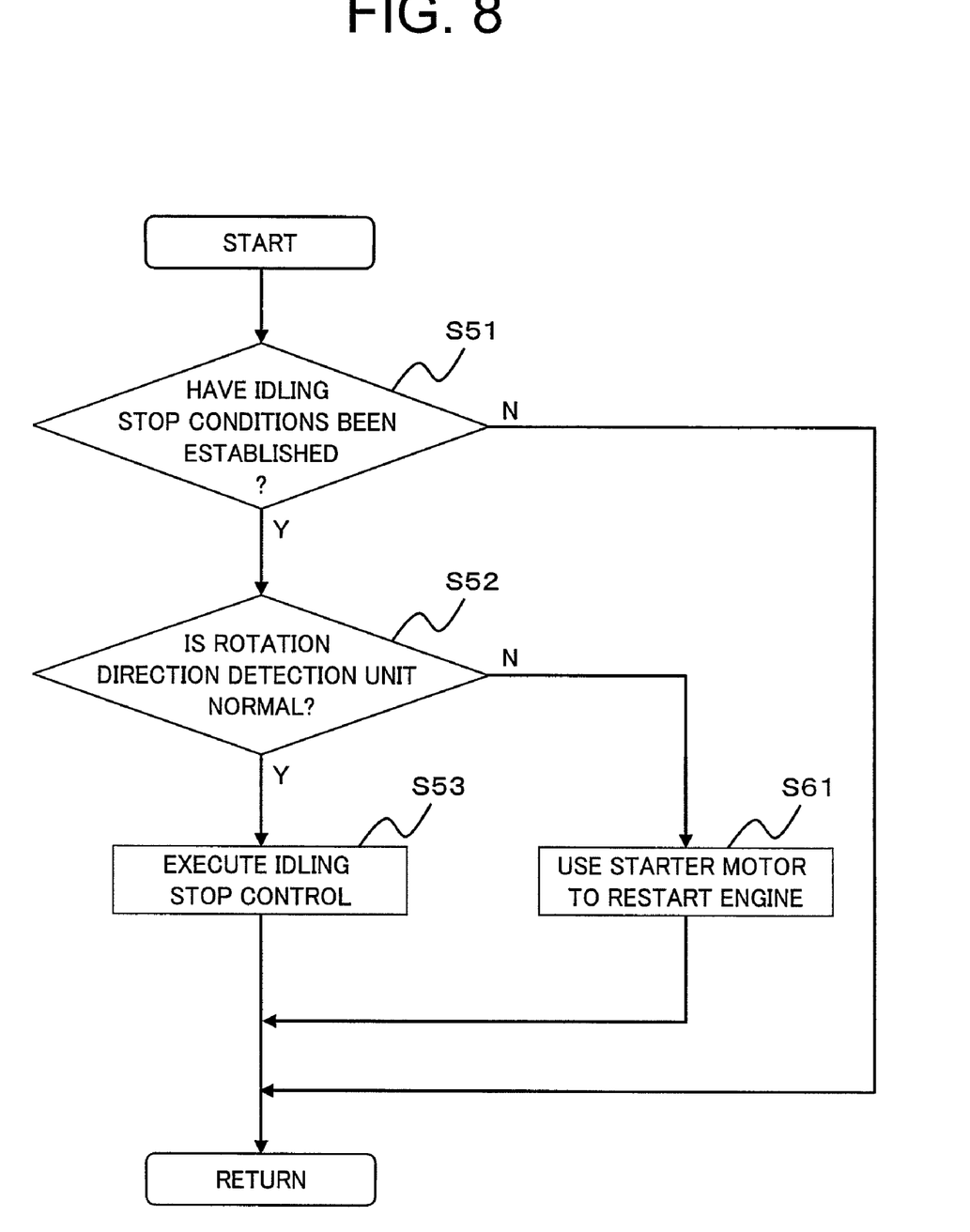
FIG. 8 is a flowchart illustrating an operation of the idling stop control unit according to a fifth embodiment of the present invention.

Next, referring to a flowchart of FIG. 8 together with FIG. 6, the operation of the idling stop control unit 14 according to the fifth embodiment of the present invention is described.

The operation illustrated in the flowchart of FIG. 8 is repeatedly executed for each predetermined time period (for example, every 5 msec) after the vehicle restart.

The description of the same operation as that in the fourth embodiment described above is herein omitted.

First, the idling stop control unit 14 determines whether or not the rotation direction detection unit is normal (Step S52).

When it is determined in Step S52 that the rotation direction detection unit is normal (in other words, determined as "Yes"), the idling stop control unit 14 executes the idling stop control (Step S53) to terminate the processing of FIG. 8.

On the other hand, when it is determined in Step S52 that some abnormality occurs in the rotation direction detection unit (in other words, determined as "No"), the idling stop control unit 14 uses the starter motor 13 to restart the engine (Step S61). Then, the idling stop control unit 14 terminates the processing of FIG. 8.

According to the internal combustion engine control apparatus 1A in the fifth embodiment of the present invention, even if the idling stop conditions have been established, the idling stop control unit 14 uses the starter motor 13 to restart the engine when the abnormal state of the rotation direction detection unit is detected.

Therefore, a situation where the engine restart becomes difficult can be prevented in advance. In addition, the fuel is prevented from being injected into a wrong cylinder to be ignited. As a result, the engine or the suction/exhaust system can be prevented from being damaged.

The signal rotor 2 secured to the crank shaft 4 has been described in the first to fifth embodiments described above, but the signal rotor 2 is not limited thereto. The signal rotor 2 may be secured to a cam shaft (not shown) indirectly connected to the crank shaft 4.

Even in this case, the same effects as those of the first to fifth embodiments can be produced.

Each of the embodiments of the present invention has been described by way of examples, the present invention is not limited to the examples described above. It is apparent that the present invention can be carried out in various forms without departing from the scope of the invention.

What is claimed is:

1. An internal combustion engine control apparatus comprising:
    rotation detection means for detecting a rotation direction of a crank shaft of an internal combustion engine to output one of a forward rotation signal and a reverse rotation signal as a rotation direction signal, and for outputting a pulse signal according to a rotation speed of the crank shaft;
    stop position calculation means for calculating, based on an output from the rotation detection means, a stop position of the crank shaft when the internal combustion engine stops; and
    abnormal state detection means for detecting an abnormal state of the rotation detection means when an actual rotation direction of the crank shaft differs from the rotation direction of the crank shaft indicated by the rotation direction signal.

2. An internal combustion engine control apparatus according to claim 1, wherein the abnormal state detection means detects the abnormal state when the reverse rotation signal is output in the case where the crank shaft rotates in a forward direction at a speed equal to or higher than a predetermined rotation speed.

3. An internal combustion engine control apparatus according to claim 1, wherein the abnormal state detection means detects the abnormal state when the reverse rotation signal is output in the case where the crank shaft is rotated in the forward direction by a starter motor for starting the internal combustion engine.

4. An internal combustion engine control apparatus according to claim 1, wherein the abnormal state detection means detects the abnormal state when the forward rotation signal is output in the case where the crank shaft is rotated in a reverse direction by a motor generator for rotating the crank shaft.

5. An internal combustion engine control apparatus according to claim 1, further comprising:
    operating state detection means for detecting an operating state of a vehicle including the internal combustion engine; and
    idling stop control means for executing idling stop control according to the operating state and for stopping the idling stop control when the abnormal state detection means detects the abnormal state.

6. An internal combustion engine control apparatus according to claim 1, further comprising:
    operating state detection means for detecting an operating state of a vehicle including the internal combustion engine; and
    idling stop control means for executing idling stop control according to the operating state and for using a starter motor for starting the internal combustion engine to restart the internal combustion engine when the abnormal state detection means detects the abnormal state.

7. An internal combustion engine control apparatus according to claim 1, wherein the rotation detection means includes a rotation direction detection unit that detects the rotation direction of the crank shaft of the internal combustion engine and a rotation speed detection unit that outputs the pulse signal according to the rotation speed of the crank shaft.

* * * * *